Patented Dec. 25, 1928.

1,696,542

UNITED STATES PATENT OFFICE.

GEORGE B. BURNHAM, OF RENO, NEVADA, ASSIGNOR TO BURNHAM CHEMICAL COMPANY, OF RENO, NEVADA, A CORPORATION OF NEVADA.

PROCESS FOR EVAPORATING BRINES.

No Drawing.   Application filed November 16, 1925.   Serial No. 69,273.

This invention relates to processes for increasing the concentration of brine by natural evaporation.

An object of my invention is to expose a large surface of the brine being evaporated to the sun and wind.

Another object of my invention is to prevent the formation of a salt crust on the brine being evaporated.

The invention possesses other advantageous features, some of which with the foregoing, will be set forth at length in the following description where I shall outline in full the preferred form of the process of my invention.

Broadly speaking, my invention comprises a process in which brine is exposed to the sun and wind in ponds of sufficient area and depth to have considerable wave action, by means of which the formation of a salt crust is prevented.

In many processes for obtaining the salts from saline liquor, such as the subterranean brine found at Searles Lake, California, it is necessary to concentrate the brine to bring it approximately to saturation with the salt which it is desired to obtain. An effective and economical manner to increase the concentration of the brine is to evaporate some of the water by exposing the brine in a pond to the action of the sun and wind. The evaporation is continued until the brine has reached the desired degree of concentration and the brine is then removed from the pond for further treatment in the recovery process being used. It is of course advantageous to have the evaporation proceed as fast as possible with the natural heat of the sun. The speed or rate of evaporation depends to a large degree upon the surface of brine exposed to the action of the sun and wind.

As the exposed saline liquor evaporates, a crust composed of crystals of salt in suspension in the liquor, tends to form over the surface of the pond shutting off the brine from contact with the air. The salt crust extending over the liquid decreases the rate of evaporation very markedly, not only because vapor cannot escape from the surface of the pond, but also because the liquid is kept from contact with the wind which is a great aid to evaporation.

I have found by experiment that the size of a pond largely determines the amount of wave action produced on its surface by the wind. A pond which is relatively large in area and great in depth has a much greater wave action than a pond which is shallow or small in extent.

In carrying out the process of my invention at Searles Lake, I preferably pump the subterranean brine into ponds of large area and great depth where it is exposed for some time to the action of the sun and wind. Because the pond is large, the wave action is considerable and inasmuch as the surface of the liquid is continually agitated, a large surface is exposed to the atmosphere and the formation of the deleterious salt crust is effectually prevented. Due to the relatively great wave action and the absence of a superficial salt crust, the evaporation of the brine proceeds rapidly. The brine may be pumped from its subterranean position into a pond of smaller area and lesser depth in which the wave action is not as great as in the first instance and the rate of evaporation consequently is lower. It will be understood that by pumping the brine into ponds of various areas and depths I can readily control the rate of evaporation and the degree of concentration in a given length of time.

In practice, I find that with a pond about 40 acres in area and from 1 to 3 feet deep even a slight breeze produces a wave action in which the crust formation is negligible and in which the evaporation is very rapid. On the other hand, a pond 1 acre in area and from 1 to 4 inches deep will have practically no wave action, even though there is a considerable wind, and a crust will form readily.

It will thus be understood that by regulating the size of the pond in which the brine is evaporated the rate of evaporation may readily be controlled, and while I have described the process of my invention as used in connection with Searles Lake brine, it is also adapted for use with other brines, naturally occurring or artificial.

I claim:

The process of evaporating Searles Lake brine which comprises pumping the brine from its normal subterranean position, and exposing the pumped brine in an open pond of sufficient extent and depth to be conductive to wave action in the brine under the influence of the wind, whereby the formation of a salt crust is prevented.

In testimony whereof, I have hereunto set my hand.

GEORGE B. BURNHAM.